Aug. 4, 1964   H. E. FORDYCE ETAL   3,143,498
APPARATUS FOR TREATMENT OF SEWAGE
Filed Oct. 27, 1960   2 Sheets-Sheet 1

INVENTORS.
Homer E. Fordyce
Charles E. Loefel
BY
ATTORNEY.

Aug. 4, 1964  H. E. FORDYCE ETAL  3,143,498
APPARATUS FOR TREATMENT OF SEWAGE
Filed Oct. 27, 1960  2 Sheets-Sheet 2

INVENTORS.
Homer E. Fordyce
Charles E. Loetel
BY *Hrs. E. Serfield*
ATTORNEY.

United States Patent Office 3,143,498
Patented Aug. 4, 1964

3,143,498
APPARATUS FOR TREATMENT OF SEWAGE
Homer E. Fordyce, Kansas City, Mo., and Charles E. Loetel, Overland Park, Kans., assignors to The Marley Company, a corporation of Missouri
Filed Oct. 27, 1960, Ser. No. 65,423
11 Claims. (Cl. 210—109)

This invention relates generally to the treatment of sewage or other wastes and is concerned principally with a method and apparatus for treating sewage to remove bulk solids therefrom and to reduce the bacteriological and chemical oxygen demand thereof to a point where the treated sewage or wastes can be safely flowed on into surface waters such as rivers and streams and the like.

The handling of sewage and other wastes has become a problem of ever increasing complexity as the population and industrial activity of the nation has increased. Perhaps no area of greater criticality exists than in situations where the sewage is disposed of by delivering it to flowing surface waters such as streams and rivers. As is known, untreated or even partly treated sewage and certain wastes have an affinity for oxygen expressed in terms of oxygen demand (B.O.D. and C.O.D.). If excessive amounts are discharged into surface waters, the oxygen in the surface water which normally supports aquatic life therein is taken up instead by the sewage or wastes. The streams and rivers thus become useless for any purposes other than waste carriers.

Present day sewage treatment also presents other problems. In many treatment systems the solids must be separated from the liquid influent. Disposal of these separated solids or sludges formed therefrom involve elaborate equipment and considerable labor. Large settling vats are required as well as screens, skimming tanks and the like. In some treatment methods elaborate sedimentation traps and filtration beds are utilized.

It is one of the principal features of our invention that it provides a novel and effective sewage or waste treatment which not only eliminates the problem of sludge collection and disposal, but also provides for reduction of the B.O.D. and C.O.D. to values which permit discharge of the effluent directly to surface waters without excessive contamination. It is therefore one of the principal objects of the invention to provide a method of and apparatus for handling sewage or waste of such simplicity and low cost as to make it preferable to the complex sewage disposal plants now employed by municipalities and organized sewer districts. An important feature of the invention, however, is that it is not limited in applicability to large installations alone. It also provides a simple and effective substitute for the septic tank and variations thereon which have so long served as the principal sewage treatment method for occupied buildings located outside the ambit of sewer systems.

It is a further object of the invention to provide a treatment method and apparatus which results in an odorless effluent containing no solids and which itself produces little or no odor during use.

Still a further object of the invention is to provide a self-contained treatment plant which involves simple equipment and which can be operated over long intervals with a minimum of supervision. It is a feature of the invention in this respect that means are provided for limiting the period of operation of powered components to only that required for effective treatment and that the solids treatment is governed in response to the quantity of solids arriving in the influent.

Yet another object of the invention is to provide a treatment method and apparatus which requires no special reagents or chemicals nor supplemental water supply. In our method the treatment is effected by utilization of air alone. In this connection one of the important features of the invention is the steps and apparatus employed to obtain optimum exposure of the sewage or wastes to air during the treatment phase.

Still further objects of the invention are to provide apparatus for the purpose hereinbefore set forth which is simple to construct and operate, which is readily adaptable in size to sewage disposal systems of varying capacity, which requires a minimum of maintenance, and which is useable in areas of widely varying climatic conditions.

Other and further objects of the invention together with the features of novelty appurtenant thereto will appear in the course of the following description.

In the accompanying drawings which form a part of the specification and are to be read in conjunction therewith, and in which like reference numerals indicate like parts in the various views.

Figure 1:
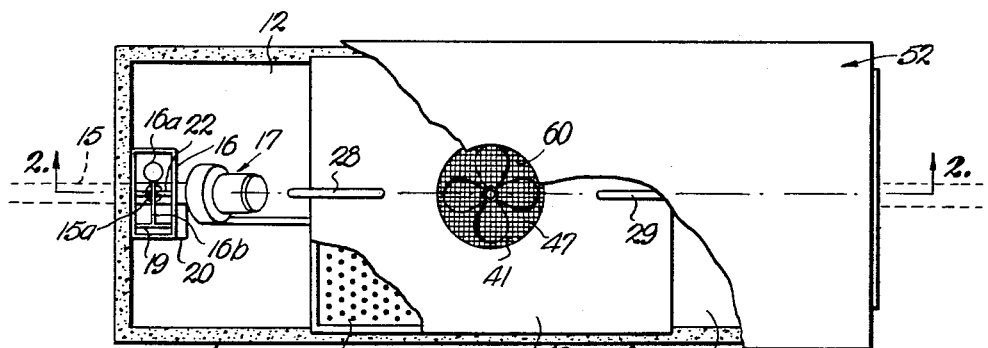
FIG. 1 is a top plan view of the treatment plant incorporating features of the invention, the cover being in part broken away to expose the internal structure.
Figures 3, 4:
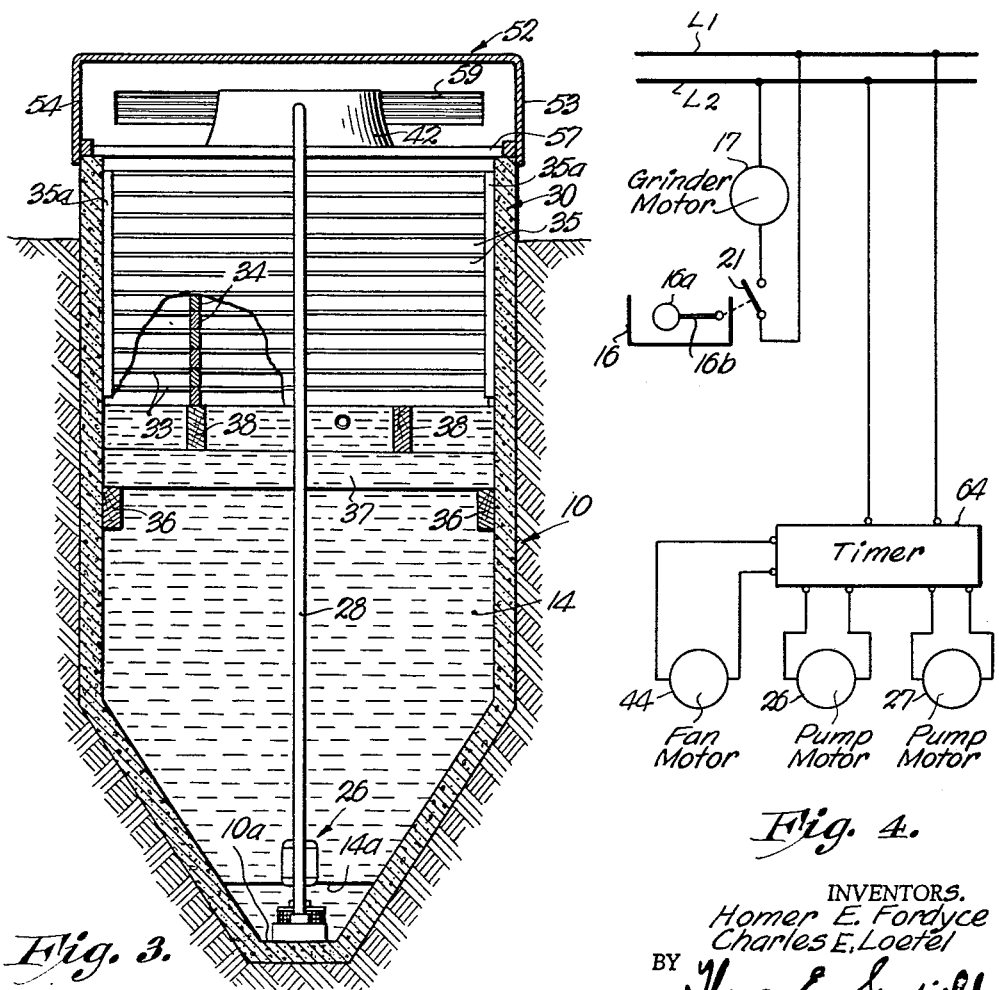
FIG. 3 is a sectional view taken along the line 3—3 of FIG. 2 in the direction of the arrows.
FIG. 4 is a diagrammatic showing of the electrically powered components and the electrical circuit involving same.
Figure 2:
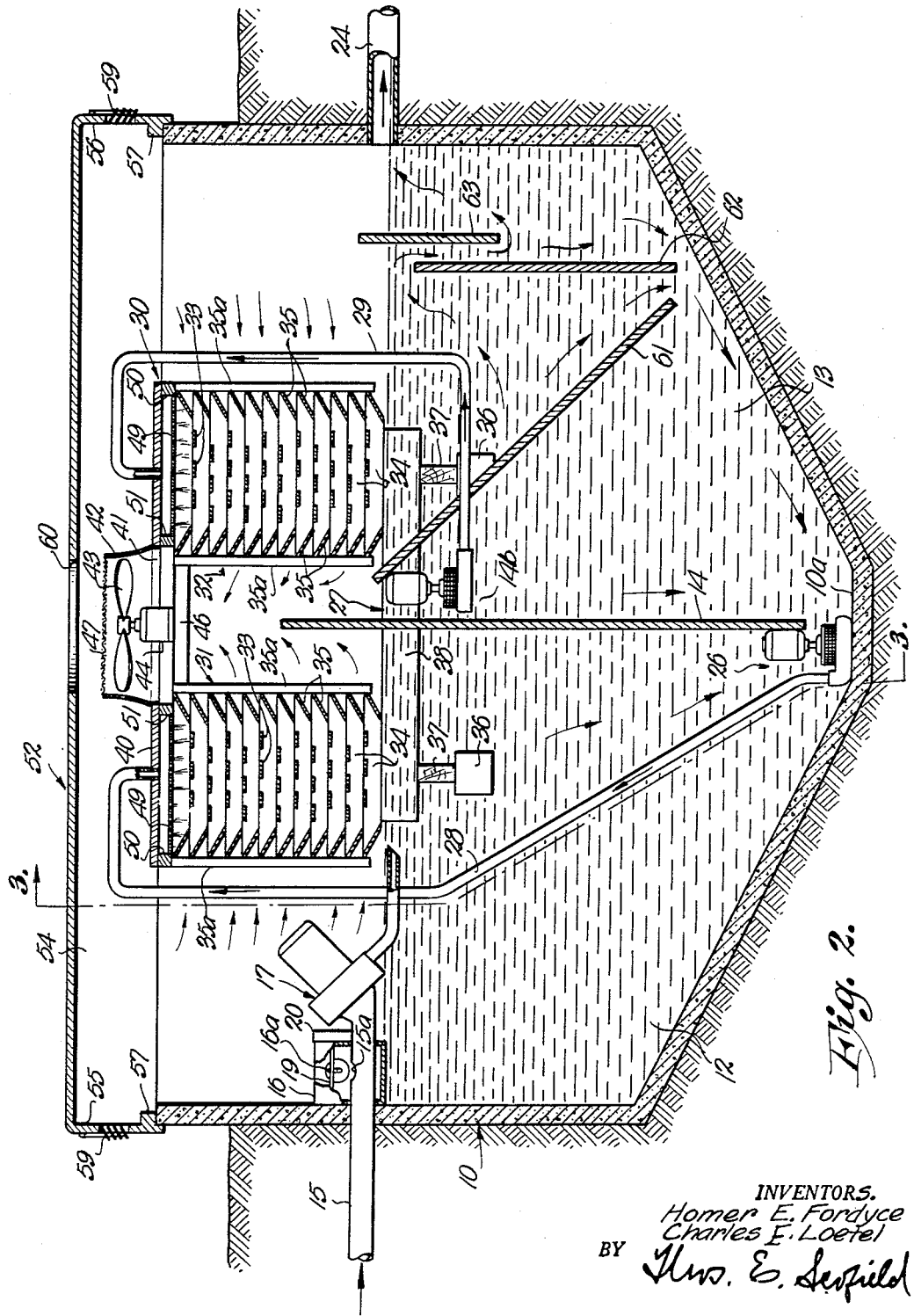
FIG. 2 is an enlarged sectional view of the same taken along the line 2—2 of FIG. 1 in the direction of the arrows.

Referring now to the drawings and initially to FIGS. 1, 2 and 3, we have selected for illustration of the method and apparatus aspects of the invention a relatively small capacity plant such as might be employed in treating sewage from a residence or rural school. As will subsequently become clear, the same basic structure, as well as the steps employed, is applicable to larger capacity plants, the changes required being matters of routine engineering only.

The main body of the plant comprises a tank or container 10 which is preferably rectangular in plan and is partly sunken into the ground 11. The tank may be constructed of any suitable material, for example concrete, plastic, wood, or metal. Because of cost considerations wood or concrete is preferred. The bottom of the tank is hopper shaped, preferably as a four-sided pyramid, terminating in the flat central area 10a.

The tank is subdivided into two side-by-side chambers 12 and 13 by a transverse central partition 14. Partition 14 terminates at its lower edge above the area 10a, thereby to provide a passageway 14a establishing communication between chambers 12 and 13.

Extending through the end wall of chamber 12 and providing the means for introducing raw sewage or waste thereto is the conduit 15. It will be understood that this conduit is connected at the other end with the sewer system of the residence (not shown) or other source of sewage or waste. Conduit 15 does not, in the illustrated embodiment, discharge directly into the chamber. Instead it passes through a float chamber 16 with which it communicates through an opening 15a in the conduit to the inlet side of a motor-driven grinder and comminuter 17. The grinder is of the well-known screen type and since the details of construction play no part in the present invention they will not be enlarged upon. It suffices to note that the grinder is capable of reducing any bulk solids to small particles, the smaller the better. The discharge from the grinder or comminuter is through the pipe 18 which is preferably located with its outlet end below the level of liquid which normally obtains in the chamber, which has the effect of reducing foaming.

As is known, sewer lines are nonpressurized and consequently the amount of sewage arriving at the plant through conduit 15 will be dependent upon the input at the source. Much of the liquid is derived from sink drains, washing machines and the like which carry no bulk materials. Consequently it is unnecessary (and would be excessively wasteful of power) to cause the grinder 17 to operate on a continuous basis. The float chamber 16 forms part of a means for causing the grinder to operate only at such times as there is a ready supply of bulk material to be comminuted.

As is seen in FIGS. 1 and 2, and also as schematically shown in FIG. 4, the float chamber 16 contains therein a float 16a carried by an arm 16b. The arm 16b is mounted on a shaft 19 journaled in the chamber for rotation about its own axis and which extends at one end into a switch housing 20 mounted on the side of the float chamber. The housing 20 contains a conventional on-off electric switch having a movable contact 21 (see FIG. 4). Shaft 19 is connected mechanically with the movable contact 21 of the switch. A cross support 22 within the float chamber underlies arm 16b to support the float in its lowermost position which corresponds to the open position of switch contact 21. It will be evident that should the level of liquid in float chamber 16 rise sufficiently to lift float 16a and thereby rotate shaft 19 to the point of closing of contact 21, the grinder motor will start and will continue to operate until the liquid level falls sufficiently as to again lower the float and return contact 21 to the open position.

The rise of liquid in float chamber 16 is dependent upon the extent of collection of bulk matter such as paper, feces, rags and other solids in the grinder chamber while the latter is inoperative. As is known, liquid alone will flow freely through the grinder. However, bulk matter above small particle size will be intercepted and eventually will restrict the liquid flow to the point where liquid will back up in the conduit and float chamber and eventually lift float 16a to the point of closing contact 21. The periodic automatic operation of the grinder based on the amount of bulk matter arriving at the tank insures of the most efficient utilization of power and eliminates any necessity of attendance of operators at the site.

The grinder has the effect of reducing the solids to essentially uniform particles which are delivered to chamber 12 in suspension in the liquid component of the sewage.

Chambers 12 and 13 are in communication with one another through the medium of the passageway 14a which tends to promote equalization of the liquid level in the two chambers. Discharge of liquid from the treatment plant is effected by gravity through a discharge conduit 24 which connects with chamber 13. The vertical location of conduit 24 determines the liquid level which will be maintained in the respective chambers. It at no time will fall below the level of the lowest point of the entrance to conduit 24 from chamber 13. Thus, once the plant has been connected with a sewer and the chambers have filled, they will be maintained in a filled condition and the discharge rate of effluent will be substantially the same as the entry rate of influent. It will be understood that the discharge conduit 24 leads continuously to lower grade in order to maintain flow away from the treatment plant.

During its stay in the chambers 12 and 13, which can be regarded as collection and storage chambers, the liquid carrying the finely divided particles is maintained in a semi-agitated state and subjected to removal and intimate contact therewith of a moving stream of air. In establishing the air-to-liquid contact the liquid is diffused into droplets and films over and past which the air moves in a direction transverse to the general direction of movement of the liquid as it is broken down into droplets and film surfaces. The liquid in both chambers is subjected in progressive cycling fashion to the air treatment described.

The removal of liquid from the chambers 12 and 13 for purpose of aeration is accomplished by the submerged pumps 26 and 27. The pump 26 is disposed adjacent the bottom of the tank. The location of pump 26 at the bottom is to insure that the heavier particles which have a tendency to collect toward the bottom by reason of sedimentation will be cycled through the aeration stage of the treatment and exposed to decomposition through oxidation. The pump 27 is preferably located relatively near the top of the chamber 13, and can be supported in any suitable fashion therein, as, for example, by the shelf 14b extending from partition 14. The pumps may be of any commercial type capable of handling ground sewage.

The discharge of each pump 26 and 27 is connected respectively with a riser pipe 28 or 29 which serves to convey the liquid through the top of an aeration and oxygenating structure generally indicated by reference numeral 30.

The structure 30 comprises a pair of substantially identical water diffusion and air contacting zones 31 and 32, one for each of the chambers 12 and 13. Each zone includes a plurality of vertically separated open decks made up of laterally spaced coplanar slats or bars 33. The slats of adjoining decks are staggered with respect to one another so as to prevent liquid from falling therethrough in a straight path. In the preferred embodiment the slats 33 extend from one side wall of the tank to the other and are supported at spaced intervals along their length by combined support and spacer members 34.

As can best be seen in FIGS. 2 and 3 the spacer members 34 are arranged in vertical rows and extend transversely of the slats 33. The upper edges of the members 34 are notched to receive the slats and the slats are confined in the notches by the lower edge of the members 34 immediately thereabove. The lower edge of each member 34 turns in upward incline near its opposite ends to provide slanted surfaces and secured to the inclined or slanted surfaces are louver-like slats 35. Slats 35 serve both as splash preventers for confining liquid flow to the aeration zone and as air guides as will later be made more clear. Vertical bars 35a secured to the inside surface of the tank wall engage the outer edges of the slats 35 near their ends to rigidify the structure.

In the illustrated embodiment of the invention the oxygenating structure 30 is supported at its elevated position by means of a system of supports and joists which involve the supports 36 secured to or formed on the respective side walls of the tank and two spaced parallel cross joists 37 which have their ends carried by the supports 36 and extend between the side walls. Resting upon and secured to the cross joists 37 are the parallel spaced supports 38 which underlie and carry the vertical rows of spacers 34. It will be understood, of course, that where it is necessary for the supports 38 to pass through the partition 14, suitable openings and seals will be provided.

Forming the top of the oxygenating structure is the top member 40 which completely covers both of the diffusing and air contacting zones and their included tiers of bars 33. The top member 40 is provided with a central air outlet aperture 41 in which is fitted a fan shroud 42 which surrounds and forms a ducting for the fan blade or propeller 43. A motor 44 is provided for the fan, this being suported in any suitable fashion as by cross brace 46 in the top opening. The blade 43 is protected from the top by the screen 47 at the outlet end of the shroud.

The fan is constructed to discharge air upwardly and draw it from below, there being provided below the fan a plenum chamber 48 which is located between and in communication with the interior of the liquid diffusing zones 31 and 32. During operation of the fan air is drawn inwardly between the outside inclined slats 35 of the respective diffusing zones through the central section thereof in a generally horizontal path and then out between the inside inclined slats into the plenum chamber and thence through the fan to the exterior of the structure.

Liquid from each chamber is delivered to the upper end of the respective zones 31 and 32 by the risers 28 and 29, as earlier noted. The risers deliver the liquid onto a perforated plate 49 which overlies each diffuser structure and is bounded by side members such as 50 and 51 in each case to form a pan-like receptacle for liquid from the risers. The perforations of the plates 49 are sized and spaced to cause division of the liquid discharged from the riser into separate laterally spaced streams which descend by gravity into the diffuser structure.

As will be evident by virtue of the spaced and staggered slats or bars 33, the liquid streams emerging from the perforations of plates 49 are further broken up into droplets and film-like streams as the liquid descends through the diffusers and over the tiers of bars 33. These droplets and films are subjected during the full time of descent to the transversely moving air being drawn through the diffusers by the fan and are thereby subjected to a continuously replenished supply of oxygen. The result of this in sewage is to cause aerobic decomposition of the organic matter and satisfaction of the oxygen demand. The intense diffusion of the liquid and simultaneous contact therewith of a moving body of air continuously replenished from the surrounding atmosphere insures of rapid take-up of oxygen and a concurrent rapid satisfaction of the inherent oxygen demand of the sewage.

The entire plant structure is covered from above by a lid 52 having the depending sides 53 and 54, respectively, and the ends 55 and 56, respectively. The lower edges of the sides and ends are provided with an inwardly projecting flange 57 running continuously around the structure which is designed to seat upon the upper edges of the side walls of the tank. The ends are provided with air inlet openings fitted with adjustable louvers 59. These louvers can be used to increase or decrease the amount of make-up air to the diffuser and contacting zones. Centrally of the cover is provided a discharge aperture 60 which is in line with discharge of the fan.

The cover serves not only to conceal and protect the internal structure of the plant but also to provide a means for recycling the air within the confines of the tank and cover during periods of extremely cold outside temperatures. In the case of extremely cold temperatures the louvers can be adjusted to partially close the openings whereby to cause recyling of some of the air that is delivered by the fan toward discharge. This air, having adsorbed heat by the taking on of moisture as it moves through the diffusing and contacting zones 31 and 32, will be warmer than the outside air and can be mixed therewith in order to reduce the danger of icing.

By providing the multiple-stage treatment, that is, the arrangement of chambers and aerating diffusers in series and the combination of a high degree of diffusion with moving air in contact with the diffused liquid, we have been able to obtain a tremendous reduction in equipment and ground area required for a treatment plant. Moreover, the solids are removed as a part of the aeration treatment, the high availability of oxygen combined with the small particle size making it possible to fully decompose the solids and eliminating any problem of sludge removal or separate treatment thereof.

The cycling of liquids from the chambers through the diffusers, the action of the pumps 26 and 27 and the discharging of liquid from chamber 12 into the lower reaches of chamber 13 all combine to maintain a substantial degree of agitation in the tanks. This in turn insures against excess collection of solids in the lower portions of the chambers and promotes a fairly uniform consistency in the liquid during its period of storage in the chambers.

In order to reduce even further the likelihood of discharge of any substantial quantity of untreated solids at the discharge conduit 24, we have provided the arrangement of transfer baffles or solids directing guides shown at 61, 62 and 63, respectively, in FIG. 2. Each of these baffles extends transversely from one side wall to the other and the ends are secured to the side walls in any suitable fashion.

The baffle 61 is disposed in an inclined position below the right-hand diffusing and contacting zone 32 with its upper edge above the liquid level. The baffle 61 serves to shield the pump 27 from the discharge from this zone. Obviously any solids tending to settle in chamber 13 will be constrained to travel downwardly to the lower edge of the baffle 61 before settling toward the bottom and thus will be kept away from the pump. Moreover, any liquid picked up by the pump will first have to travel beneath the lower edge of baffle 61 or rise from the bottom of the chamber. Consequently, it is insured that the liquid leaving the aerating zone will have to intermix substantially with the liquid in the chamber before again being taken up by the pump. As is evident, the lower edge of the baffle 61 is spaced from the bottom wall of the tank to permit settlement of the solids back toward the bottom 10a.

Further interception of any solids is accomplished by the vertical baffle 62 which has its upper edge spaced just below the surface and its lower edge adjacent but spaced from the bottom wall. Cooperating with baffle 62 is the relatively short vertical baffle 63 which extends slightly above the liquid level and defines a downward flow path for liquid moving over the upper edge of the baffle 62. Since any solids spilling over the upper edge of baffle 62 must follow a downward path, they will tend to continue downwardly while clear liquid can rise toward the conduit 24. Any solids spilling over the upper edge of baffle 62 are thus directed downwardly and permitted to settle toward the bottom 10a through the gap provided between the lower edge of baffle 62 and the inclined bottom wall of the tank.

Through the foregoing arrangement it will be seen that generally speaking the pump 27 handles relatively clear liquid, while pump 26 flows the greatest concentration of solids. The heavier solids, that is, those which will tend to settle to the bottom, are thus passed repeatedly through the first aeration and diffusion zone 31 until they are sufficiently oxidated as to remain in suspension in the liquid at some level above the bottom and thus out of the intake influence of pump 26.

The arrangement of the diffusion and aeration zones 31 and 32 in such fashion that they span the side walls of the casing is instrumental in inhibiting the formation of a stagnant, heavy foam layer on the surface of the liquid in either chamber. As will be evident, any foam will be subjected to the inwardly directed air currents and will tend to be swept or drawn beneath the descending liquid where it will be broken down by contact therewith. In addition, any solids suspended in the foam or floating material will be likewise swept into the path of the descending liquid and consequently mixed into the collected sewage.

It will be understood that the rate of pumping through pumps 26 and 27, the size of the aeration structure and the rate of air flow through the diffused liquid will be determined largely by the oxygen demand of the influent and the load of the sewer system which the plant serves. High load systems, such as municipal systems, will require relatively larger storage chambers and possibly more of them. It will be understood that any number of chambers with associated forced air diffusers can be arranged in series, the number increasing as the load increases.

The period of operation required for the pumps 26 and 27 and the fan is determined by analyzing the oxygen demand of the effluent and adjusting accordingly. Assuming that a requirement for discharge to surface waters specifies a maximum permissible oxygen demand, the length of time the pumps operate is determined by increasing their period of operation until this standard is met. However, in addition, the pump capacity should be such that sewage which is at any time quiescent in either chamber does not become devoid of oxygen.

The pumps 26 and 27 and fan motor 44 are, in the illustrated embodiment, electrically driven and connected through a timer 64 with the power lines L1 and L2. The timer is used to permit adjustment of the periods of operation according to the demands of the sewer system being served. We prefer a clock timer which can be set to cause set periods of operation during each hour of the day, the pump and fan being started on the hour and shut off after the time interval which will result in a satisfactory effluent has elapsed. While each individual installation could be designed to operate continuously with smaller sized diffusers and pumps, nevertheless the arrangement which we suggest provides a means of standardizing on a given size unit which can be mass produced and sold for a wide variety of uses. In the case of municipal or organized sewer districts the installation will be tailored to the optimum load condition to be met.

From the foregoing it will be seen that this invention is one well adapted to attain all of the ends and objects hereinabove set forth together with other advantages which are obvious and which are inherent to the invention.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described our invention, we claim:

1. Apparatus for reducing the biological and chemical oxygen demand of liquid waste products comprising a waste receiving container subdivided into at least two side-by-side chambers open at the upper ends, means for flowing waste products into one of said chambers, a transfer passageway between said chambers operable to cause transfer of liquid from said one chamber into the other, a discharge conduit connected with the other of said chambers and located to cause flow of liquid from said second chamber when the level therein exceeds a predetermined value, an oxygenating structure disposed centrally of said chambers and having oppositely extending portions overlying and spaced above the liquid level of the respective chambers, pump means in each chamber for withdrawing liquid from the chamber and delivering it to the upper end of the corresponding overlying portion of said oxygenating structure, liquid diffusion means within each portion arranged to diffuse and retard the downward flow of liquid in said portion but permitting the liquid to reenter the chamber as it leaves the diffusion means, said diffusion means being spaced from one another to provide an air space therebetween and open on the sides adjoining and opposite from said air space whereby to provide air flow paths transverse to the flow of liquid through the diffusion means, and blower means connected with said air space and operable to draw air therefrom whereby to cause air to flow inwardly through said flow paths in said diffusion means toward said air space whereby to intimately contact the moving air with said diffused liquid.

2. Apparatus for reducing the biological and chemical oxygen demand of liquid waste products comprising a source of waste products, a waste receiving container, means discharging said waste products from said source into said container, an outlet conduit connected with said container and located to cause flow of liquid from said container when the level therein exceeds a predetermined value, an oxygenating structure disposed above and overlying the liquid level in said container, pump means in the container operable to withdraw liquid from the container and deliver it to the upper end of the oxygenating structure, said oxygenating structure including deck means constructed to diffuse and break said liquid into free falling drops at it proceeds through the oxygenating structure, blower means associated with said deck means and operable to draw air therethrough in paths transverse to the downward flow of liquid through the diffusing means whereby to intimately contact the moving air with said diffused liquid, and air guide surfaces associated with said deck means and said blower means and so constructed as to form the moving air into a stream entering said deck means at one side thereof and leaving at the opposite side and having a cross sectional depth and width substantially equal to the depth and width of the oxygenating structure.

3. Apparatus for reducing the biological and chemical oxygen demand of liquid waste products containing bulk matter comprising a waste receiving container subdivided into at least two side-by-side chambers open at the upper ends, means for flowing waste products into one of said chambers, said means including a comminuter operable to shred and reduce the bulk matter to small particles, a transfer passageway between said chambers operable to cause transfer of liquid from said one chamber into the other, a discharge conduit connected with the other of said chambers and located to cause flow of liquid from said second chamber when the level therein exceeds a predetermined value, an oxygenating structure disposed centrally of said chambers and having oppositely extending portions overlying and spaced above the liquid level of the respective chambers, pump means in each chamber for withdrawing liquid from the chamber and delivering it to the upper end of the corresponding overlying portion of said oxygenating structure, liquid diffusion means within each portion arranged to diffuse and retard the downward flow of liquid through said portion but permitting the liquid to reenter the chamber as it leaves the diffusion means, said diffusion means being spaced from one another to provide an air space therebetween and open on the sides adjoining and opposite from said air space whereby to provide air flow paths transverse to the flow of liquid through the diffusion means, and blower means connected with said air space and operable to draw air therefrom whereby to cause air to flow inwardly through said flow paths in said diffusion means toward said air space and to intimately contact the moving air with said diffused liquid.

4. Apparatus as in claim 3 wherein said pump means includes a submerged pump disposed in each chamber, one said pump having an intake near the bottom of the chamber, said transfer passageway being also located between the bottoms of the chambers.

5. Apparatus as in claim 3 including mechanism associated with said comminuter and operable to intermittently operate same in response to the amount of bulk matter present in said waste products.

6. Apparatus as in claim 3 including a cover for said container and said oxygenating structure, said cover having a central outlet opening cooperating with said blower means to permit exhaust of air and intake apertures through which air can enter the cover under the influence of said blower.

7. Apparatus as in claim 6 wherein adjustable flow controls are provided on said intake apertures for varying the air flow rate therethrough.

8. Apparatus as in claim 4 including solids intercepting means in said second chamber interposed ahead of said discharge conduit and operable to deflect solids toward the bottom of said chamber.

9. Apparatus for reducing the biological and chemical oxygen demand of liquid waste products comprising an open top container subdivided into at least two side-by-side chambers, an inlet for liquid waste products in one of said chambers, means connecting said one chamber with the other whereby to cause flow from said one chamber into the other chamber whenever the liquid in the one chamber exceeds a predetermined level, discharge means associated with said other chamber and so constructed as to cause discharge of liquid from said other chamber when the level of liquid therein exceeds a predetermined level, liquid circulation means associated with each chamber and operable to draw liquid from the chambers and deliver it to points spaced above the predetermined liquid level in the chamber to fall by gravity back into the chamber, deck means disposed in the path of the falling liquid and operable to break up the liquid into free falling drops as it proceeds back toward said chambers, and air moving fan and guide means operable to produce forced drafts of air having a cross sectional depth substantially equal to the elevation of said points above said liquid level and moving transversely across the path of said liquid between said points and the liquid level in the respective chambers whereby to produce intimate contact of the moving air with the liquid during its return to the respective chambers.

10. Apparatus as in claim 9 wherein said air moving and guide means comprises a blower and air guide surfaces cooperating therewith to cause the air to be drawn from the atmosphere toward a central air space in communication with the blower.

11. Apparatus as in claim 9 wherein said air moving and guide means comprises a casing having spaced liquid diffusion structures respectively overlying the liquid in the chambers and defining an air space therebetween within the casing, said diffusion structures having side openings in communication with said air space and with the atmosphere exteriorly of the casing, and fan means operable to exhaust air from said air space whereby to draw air from exteriorly of the casing through said diffusing structures.

References Cited in the file of this patent

UNITED STATES PATENTS

| | | |
|---|---|---|
| 1,462,363 | Christensen | July 17, 1923 |
| 2,022,329 | Tsuda | Nov. 26, 1935 |
| 2,226,532 | Hawley | Dec. 31, 1940 |
| 2,247,514 | Mart | July 1, 1941 |
| 2,553,228 | Yonner | May 15, 1951 |
| 2,798,227 | Boester | July 9, 1957 |
| 2,825,210 | Carr | Mar. 4, 1958 |

FOREIGN PATENTS

| | | |
|---|---|---|
| 20,353 | Great Britain | of 1900 |
| 799,826 | Great Britain | Aug. 13, 1958 |
| 252,762 | Switzerland | Oct. 16, 1948 |